(12) United States Patent  
Yahyaoui et al.

(10) Patent No.: US 8,374,188 B2  
(45) Date of Patent: Feb. 12, 2013

(54) TECHNIQUES TO MANAGE A RELAY SERVER AND A NETWORK ADDRESS TRANSLATOR

(75) Inventors: Wajih Yahyaoui, Redmond, WA (US); Tony Bell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 12/144,669

(22) Filed: Jun. 24, 2008

(65) Prior Publication Data

US 2009/0316708 A1    Dec. 24, 2009

(51) Int. Cl.  
*H04N 7/173* (2011.01)

(52) U.S. Cl. ........ 370/401; 370/351; 370/389; 370/466; 370/392; 709/229; 709/238; 709/244; 709/227

(58) Field of Classification Search .................. 370/401, 370/351, 389, 400, 437, 466, 392, 352, 229, 370/395.52, 410; 709/229, 238, 244, 227; 713/150

See application file for complete search history.

(56) References Cited

U.S. PATENT DOCUMENTS

| | | | | |
|---|---|---|---|---|
| 7,227,872 | B1 * | 6/2007 | Biswas et al. ................. | 370/465 |
| 2005/0238034 | A1 * | 10/2005 | Gillespie et al. .............. | 370/401 |
| 2005/0286538 | A1 | 12/2005 | Oberle et al. | |
| 2006/0045098 | A1 * | 3/2006 | Krause .......................... | 370/396 |
| 2006/0078096 | A1 | 4/2006 | Poyhonen et al. | |
| 2006/0126596 | A1 * | 6/2006 | Shieh et al. ................... | 370/352 |
| 2006/0182100 | A1 | 8/2006 | Li et al. | |
| 2006/0215684 | A1 | 9/2006 | Capone | |
| 2006/0274741 | A1 | 12/2006 | Wing et al. | |
| 2007/0019545 | A1 | 1/2007 | Alt et al. | |
| 2007/0019619 | A1 | 1/2007 | Foster et al. | |
| 2007/0189311 | A1 | 8/2007 | Kim et al. | |
| 2007/0217407 | A1 | 9/2007 | Yuan et al. | |
| 2007/0253418 | A1 * | 11/2007 | Shiri et al. .................... | 370/392 |

OTHER PUBLICATIONS

"Publicly Routable IP Address Needed for A/V Edge Server", Retrieved at <<http://blogs.technet.com/chlacy/archive/2007/06/18/publicly-routable-ip-address-needed-for-a-v-edge-server.aspx>>, Feb. 18, 2008, pp. 1-5.

Hu Zhou, "NAT Traversal Techniques and Peer-to-Peer Applications", Retrieved at http://www.tml.tkk.fi/Publications/C/18/hu.pdf>>, HUT T-110.551 Seminar on Internetworking, Apr. 26-27, 2005, pp. 5.

Adj. Prof. Tarkoma Sasu, "Network Address Translation (NAT)", Retrieved at <<http://www.tml.tkk.fi/Opinnot/T-110.5110/2007/nat_net_081007.ppt#269,29,STUN>>, Aug. 10, 2007, pp. 48.

(Continued)

*Primary Examiner* — Andrew Chriss  
*Assistant Examiner* — Jamal Javaid  
(74) *Attorney, Agent, or Firm* — Merchant & Gould P.C.

(57) ABSTRACT

Techniques to manage a relay server and a network address translator are described. A system may include a relay server having a first private network interface operative to communicate with a private client, a second private network interface operative to communicate with a network address translator, and an enhanced relay manager module operative to receive a message from the private client over the first private network interface or a remote client over the second private network interface and through the network address translator, the enhanced relay manager module further operative to retrieve a public transport address and a mapped port for the network address translator from a mapped address attribute stored by the relay server, and send a response to the message with the public transport address and the mapped port to the private client or the remote client. Other embodiments are described and claimed.

12 Claims, 6 Drawing Sheets

OTHER PUBLICATIONS

"Nat/Firewall Support", Retrieved at <<http://www.vocal.com/nat.html>>, p. 1.
"NAT Traversal for VoIP and Internet Communications using STUN, TURN and ICE", Retrieved at <<http://www.eyeball.com/technology/whitepapers/EyeballAnyfirewallWhitePaper.pdf>>, pp. 16.
Hu, Zhou "NAT Traversal Techniques and Peer-to-Peer Applications", HUT T-110.551 Seminar on Internetworking, Date: Apr. 26/27, 2005, 5 Pages.
Tarkoma, Sasu, "Network Address Translation (NAT)", Date: Oct. 8, 2007, 48 Pages.
"Nat/Firewall Support", 1 Page http://www.vocal.com/nat.html.
"NAT Traversal for VoIP and Internet Communications using STUN, TURN and ICE", Eyeball AnyFirewall™ Technology White Paper Oct. 2007, 16 Pages.
"Publicly Routable IP Address Needed for A/V Edge Server", http://blogs.technet.com/chlacy/archive/2007/06/18/publicly-routable-ip-address-needed-for-a-v-edge-server.aspx.

* cited by examiner

```
RECEIVE A MESSAGE BY A RELAY SERVER
202
```

```
RETRIEVE A PUBLIC TRANSPORT ADDRESS AND A
MAPPED PORT FOR A NETWORK ADDRESS TRANSLATOR
FROM A MAPPED ADDRESS ATTRIBUTE STORED BY THE
RELAY SERVER
204
```

```
SEND A RESPONSE TO THE MESSAGE WITH THE PUBLIC
TRANSPORT ADDRESS AND THE MAPPED PORT
206
```

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| ATTRIBUTE TYPE 402 ||||||||||||||||| LENGTH 404 |||||||||||||||
| ALLOCATED PORT 406 ||||||||||||||||| MAPPED PORT 408 |||||||||||||||
| ALLOCATED ADDRESS 410 ||||||||||||||||| MAPPED ADDRESS 412 |||||||||||||||

TECHNIQUES TO MANAGE A RELAY SERVER AND A NETWORK ADDRESS TRANSLATOR

BACKGROUND

Network Address Translation (NAT) refers to a technique that involves re-writing the source and/or destination addresses of network packets as they pass through a router or firewall. A NAT device, such as a NAT-enabled router, allows multiple hosts on a private network to access a public network such as the Internet using a single public network address, such as an Internet Protocol (IP) address. A NAT device, however, sometimes makes it difficult to provide connectivity between a device on a private network and a device on a public network or another private network.

To compensate for end-to-end connectivity problems, certain protocols have been developed to allow a public client to traverse a NAT device. One such protocol is the Session Traversal Utilities for NAT (STUN) protocol. The STUN protocol allows a public client to obtain a transport address which may be useful for receiving packets from a peer. Addresses obtained by STUN, however, may not be usable by all peers. The STUN addresses may not work depending on the topological conditions of the network. To augment or enhance the STUN protocol, a public-accessible relay server may be implemented to relay packets of media information between any peers that can send packets to the public Internet, including public peers and private peers. The Traversal Using Relay NAT (TURN) protocol is one protocol designed to allow a client to obtain IP addresses and ports from such a relay server.

When communicating between a public peer and a private peer using a relay server, however, the TURN protocol requires opening a range of ports on the public-side of the relay servers. Directly exposing a relay server to a public network may pose an elevated security risk, among other problems. Accordingly, there may be a need for improved techniques for a private peer to communicate media information through relay servers with a public peer, thereby improving connectivity across multiple networks implementing various NAT devices.

SUMMARY

Various embodiments may be generally directed to techniques to manage a relay server and a NAT. Some embodiments may be particularly directed to techniques for establishing a media channel between a private client and a public client, or between private clients of different private networks, through a relay server and a NAT in a heterogeneous communications system comprising both public networks and private networks. In one embodiment, the relay servers may be implemented as a STUN server and/or a TURN server to allow NAT traversal by various public and private clients.

In one embodiment, for example, a communications system may include, among other elements, a relay server having a first private network interface operative to communicate with a private client, a second private network interface operative to communicate with a network address translator, and an enhanced relay manager module operative to receive a message from the private client over the first private network interface or a remote client over the second private network interface and through the network address translator. The enhanced relay manager module may be further operative to retrieve a public transport address and a mapped port for the network address translator from a mapped address attribute stored by the relay server, and send a response to the message with the public transport address and the mapped port to the private client or the remote client. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Relay servers are used by clients that do not have direct access to a public network, such as the Internet, to acquire a public transport address. The allocated transport address is used to receive data from a selected peer. A typical communications system architecture may include a relay server placed in a perimeter network for an entity, such as a corporation or business. The relay server may include various network interfaces, such as a public network interface on its public edge used to communicate with a public network, and a private network interface on its private edge to communicate with a private network. A firewall is typically deployed on both the public and private edges of the perimeter network.

Some relay servers require the relay server to open a bi-directional range of ports on both the relay server and the public firewall. The port range may include ports allocated for different network transports, such as a network transport using the User Datagram Protocol (UDP) or the Transmission Control Protocol (TCP), among others. This increases the potential connectivity scenarios between private clients on different private networks. Some entities are not comfortable, however, opening a relatively large incoming port range on the public firewall for a number of reasons. For example, this may elevate security risks for the private network or consume scarce resources such as public transport addresses.

To solve these and other problems, various embodiments may be generally directed to an enhanced relay server mapping protocol or protocol extension designed to enable communications between multiple peer clients through one or more relay servers when the relay servers are deployed with a NAT. Some embodiments may be particularly directed to an enhanced relay server mapping protocol or protocol extension designed for specific use with relay servers implementing the TURN and/or STUN protocols to allow NAT traversal by various public and private clients. More particularly, some embodiments may implement a relay server and a NAT in a perimeter network having a topology where the NAT is located between the relay server and a public network. Although a private network or perimeter network for a business entity may have multiple NAT devices for private clients, one or more of the NAT devices may be dedicated devices for one or more relay servers, and specifically designed to provide NAT operations for the relay servers. The relay server and the NAT may implement the enhanced relay server mapping protocol or protocol extension to map certain ports between the relay server and the NAT. The relay server may then use the public transport address and mapped ports for the NAT for STUN and/or TURN messaging operations in a manner that is transparent to the clients. In this manner, the relay servers may take advantage of the NAT features while still providing connectivity to private clients and public clients communicating through security mechanisms, such as firewalls and NATs.

Figure 1:
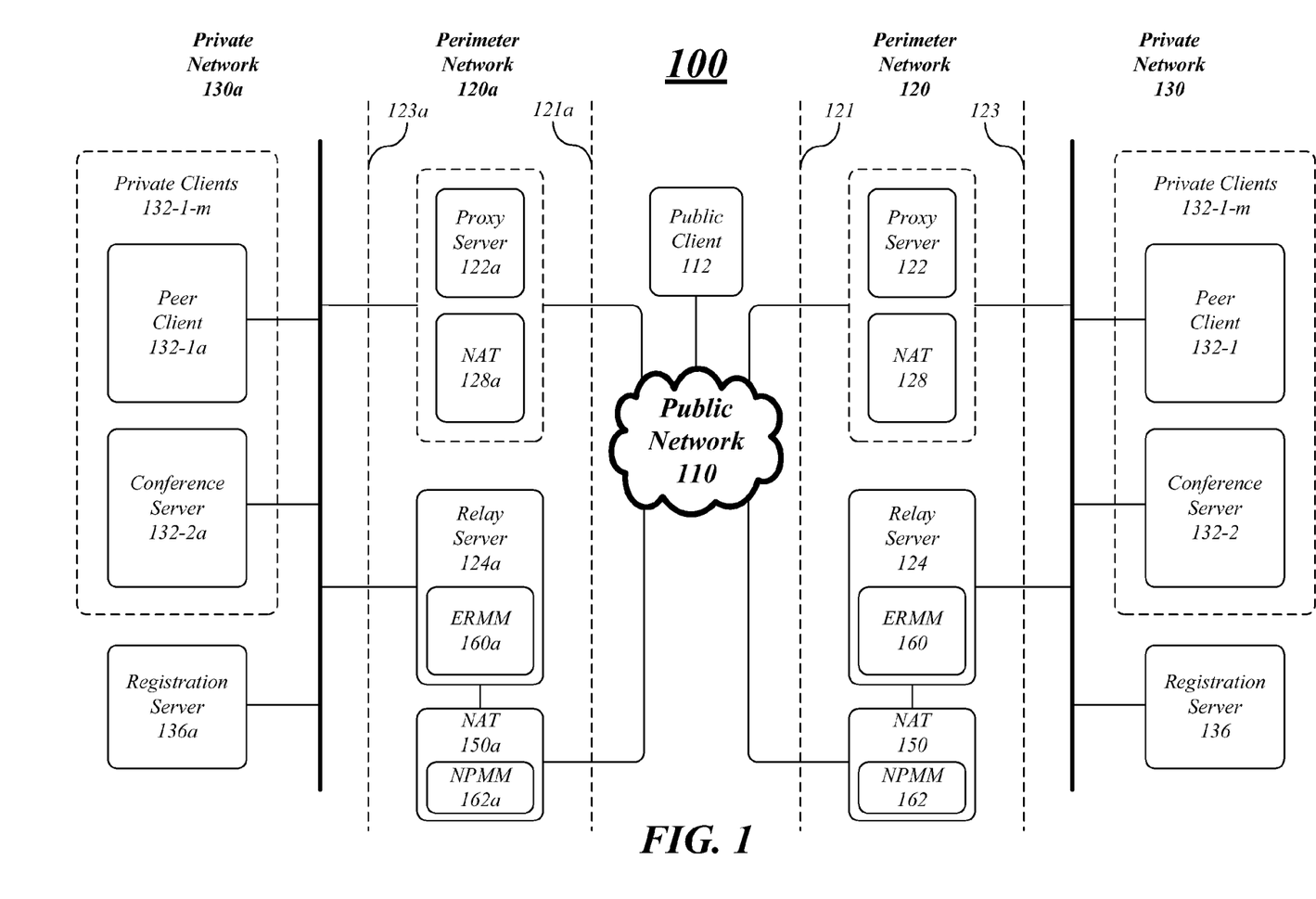
FIG. 1 illustrates one embodiment of a communication system.

FIG. 1 illustrates one embodiment of a communications system 100. The communications system 100 may represent a general system architecture suitable for implementing various embodiments. The communications system 100 may comprise multiple elements. An element may comprise any physical or logical structure arranged to perform certain operations. Each element may be implemented as a hardware element, a software element, or any combination thereof, as desired for a given set of design parameters or performance constraints. Examples of hardware elements may include without limitation devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include without limitation any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although the communications system 100 as shown in FIG. 1 has a limited number of elements in a certain topology, it may be appreciated that the communications system 100 may include more or less elements in alternate topologies as desired for a given implementation. The embodiments are not limited in this context.

In the following detailed description, some elements are labeled with a base number to uniquely identify the element. In some cases, a same or similar element implemented by a different device or network may have the same base number followed by the letter designation "a" to form a corresponding number. For example, the communications system 100 may include a relay server 124 and a relay server 124a. It may be appreciated that the description provided for an element identified by a base number is applicable to the same or similar element identified by the corresponding number. For example, the relay server 124 may be implemented with the same or similar structures and operations as the relay server 124a. In some cases, descriptions are limited to one element for purposes of clarity and conciseness, and not necessarily by limitation.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

As shown in the illustrated embodiment of FIG. 1, the communications system 100 comprises a public network 110, a perimeter network 120, and a private network 130. The public network 110 may comprise any network accessible to a general class of users without discrimination. An example of the public network 110 may include the Internet. The private network 130 may comprise any network accessible to a limited class of users with discrimination between users and controlled access. An example of the private network 130 may include a network for a business entity, such as an enterprise network. A perimeter network 120 may comprise any network accessible by both a general class of users and a limited class of users using respective public and private interfaces, thereby providing some measure of interoperability between the networks 110, 130.

In various embodiments, the networks 110, 120 and 130 may each comprise packet-switched networks capable of supporting multimedia communications between various network devices, such as a Voice Over Internet Protocol (VoIP) or Voice Over Packet (VOP) (collectively referred to herein as "VoIP") communication session. For example, the various elements of the networks 110, 120 and 130 may be capable of establishing a VoIP peer-to-peer telephone call or multi-party conference call using various types of VoIP technologies. In one embodiment, for example, the VoIP technologies may include a VoIP signaling protocol as defined and promulgated by the Internet Engineering Task Force (IETF) standards organization, such as the Session Initiation Protocol (SIP) as defined by the IETF series RFC 3261, 3265, 3853, 4320 and progeny, revisions and variants. In general, the SIP signaling protocol is an application-layer control and/or signaling protocol for creating, modifying, and terminating sessions with one or more participants. These sessions include IP telephone calls, multimedia distribution, and multimedia conferences. In one embodiment, for example, the VoIP technologies may include a data or media format protocol, such as the Real-time Transport Protocol (RTP) and Real-time Transport Control Protocol (RTCP) as defined by the IETF RFC 3550 and progeny, revisions and variants. The RTP/RTCP standard defines a uniform or standardized packet format for delivering multimedia information (e.g., audio and video) over a packet-switched network, such as the packet-switched networks 110, 120 and 130. Although some embodiments may utilize the SIP and RTP/RTCP protocols by way of example and not limitation, it may be appreciated that other VoIP protocols may also be used as desired for a given implementation.

In various embodiments, the various elements of the networks 110, 120 and 130 may perform various types of multimedia communications between various elements of the networks 110, 120 and 130. The multimedia communications may include communicating different types of information over a packet-switched network in the form of discrete data sets, such as packets, frames, packet data units (PDU), cells, segments or other delimited groups of information. The different types of information may include control information and media information. Control information may refer to any data representing commands, instructions or control words meant for an automated system. For example, control information may be used to route media information through a system, or instruct a node to process the media information in a predetermined manner. Media information may refer to any data representing content meant for a user. Examples of content may include, for example, data from a voice conversation, videoconference, streaming video, electronic mail ("email") message, voice mail message, alphanumeric symbols, graphics, pictures, images, video, audio, text and so forth. Data from a voice conversation may be, for example, speech information, silence periods, background noise, comfort noise, tones and so forth. Although the networks 110, 120 and 130 are primarily implemented as packet-switched networks, in some cases one or more of these networks may have suitable interfaces and equipment to support various circuit-switched networks, such as the Public Switched Telephone Network (PSTN), for example.

In various embodiments, the public network 110 may include one or more public clients 112. The public client 112 may be implemented as a part, component or sub-system of an electronic device having a public network address. Examples for electronic devices suitable for use as the public client 112 may include, without limitation, a processing system, computer, server, work station, appliance, terminal, personal computer, laptop, ultra-laptop, handheld computer, personal digital assistant, television, digital television, set top box, telephone, mobile telephone, cellular telephone, handset, wireless access point, base station, subscriber station, mobile subscriber center, radio network controller, conference system, router, hub, gateway, bridge, switch, machine, or combination thereof.

In various embodiments, the private network 130 may include one or more private clients 132-1-*m*. The private clients 132-1-*m* may be implemented as a part, component or sub-system of an electronic device having a private network address, which is a network address generally known to the private network 130 but not publicly routable. Examples for electronic devices suitable for use as the private clients 132-1-*m* may include the same or similar electronic devices provided with reference to the public client 112. As shown in the illustrated embodiment of FIG. 1, for example, the private clients 132-1-*m* may include a peer client 132-1 and a conference server 132-2. The peer client 132-1 may comprise a peer device to the public client 112, or another peer client 132-1*a*, both of which may be used as a multimedia end point to terminate a VoIP telephone call. For example, the peer clients 132-1, 132-1*a* may comprise packet-switched telephones, such as a VoIP phone or SIP phone. The conference server 132-2 may comprise a multimedia conferencing server to support multiple VoIP telephone calls for a multimedia conference session between multiple multimedia end points, such as two or more public clients and/or private clients. The conference server 132-2 may include, or be communicatively coupled to, various conference system components suitable for establishing, managing and terminating VoIP conference calls, such as a conference focus, one or more audio video multipoint control units (AVMCUs), gateways, bridges and so forth.

In various embodiments, the private network 130 may include a registration server 136. The registration server 136 is a centralized entity that is responsible for various network management operations for the private network 130, such as authenticating users, routing requests inside the private network 130, maintaining the Active Directory for a server operating system, and so forth. For example, before routing, the registration server 136 validates all requests that through it and ensures that the Uniform Resource Identifier (URI) in the FROM field of the SIP header of any registration requests matches the identity of the requester. In one embodiment, for example, the registration server 136 may be implemented using a MICROSOFT® OFFICE COMMUNICATIONS SERVER, made by Microsoft Corporation, Redmond, Wash. In this implementation, the peer clients 132-1, 132-1*a* may be implemented as MICROSOFT OFFICE COMMUNICATOR CLIENTS, also made by Microsoft Corporation, Redmond, Wash. The embodiments, however, are not limited to these examples.

In various embodiments, the perimeter network 120 may include various network devices to facilitate interoperability operations between devices within the networks 110, 130, such as the peer clients 132-1, 132-1*a*. In some embodiments, the perimeter network 120 may comprise network devices having public network interfaces accessible from the public client 112 from the public network 110, and private network interfaces accessible from the private clients 132-1-*m* and other network devices.

In various embodiments, the perimeter network 120 may optionally include a proxy server 122. The proxy server 122 may generally control access to the private network 130. The proxy server 122 is a server that accepts client requests from the public Internet and routes it to the appropriate destination based on the client request. It also validates a client request before forwarding. For example, the proxy server 122 may operate as a connection point for external or public clients for various VoIP operations, such as SIP signaling. In one embodiment, for example, the proxy server 122 provides an authenticated and secure SIP channel to discover the location of, and obtain authentication credentials for, a STUN relay service provided by the relay server 124 in multimedia communications systems, such as the communications system 100. The SIP clients or User Agents (UA) may be on a public network or a private network, such as respective networks 110, 130. The authentication credentials may be obtained either in a first party manner by a given client for use by itself, or alternatively, in a third party manner where a given client obtains authentication credentials on behalf of another client, such as for adding a client to a conference call system. In the latter case the third party could be authenticated and authorized to obtain this information on behalf of others. The proxy server 122 ensures that communications on the channel used to obtain the authentication credentials are secure and external or public clients are authenticated.

In various embodiments, the perimeter network 120 may include one or more network devices to implement NAT and/or firewall operations. Such operations are typically performed by devices disposed between the public network 110 and the private network 130. In some cases, these operations are typically performed by devices disposed between the public network 110 and the proxy server 122, as indicated by the dashed lines 121, 121a. In the illustrated embodiment shown in FIG. 1, for example, the perimeter network 120 includes the NAT 128. Although the topology of the illustrated embodiment in FIG. 1 shows the NAT 128 parallel to the proxy server 122, it may be appreciated that the NAT 128 may be positioned between the proxy server 122 and the public network 110 as indicated by the dashed lines 121, 121a. The embodiments are not limited in this context.

The NAT 128 may implement various NAT operations for the private network 130. The NAT 128 may re-write the source and/or destination addresses of network packets as they pass between the networks 110, 130. In this manner, the NAT 128 allows multiple hosts (e.g., the private clients 132-1-m) on the private network to access the public network 110 using a single public network address, such as an IP address. The NAT 128, however, sometimes makes it difficult to provide connectivity between the public client 112 and the private clients 132-1-m for a number of reasons, such as security issues since the public client 112 is unknown to the private network 130, difficulty in obtaining a network address for a client behind a NAT device, overhead costs, and so forth. Similarly, the private network 130 may be protected by a corporate firewall that prevents outside users from gaining access to the resources of the private network 130. The corporate firewall may also make it difficult to provide connectivity between public and private clients.

To compensate for end-to-end connectivity problems, the perimeter networks 120, 120a may implement respective relay servers 124, 124a to allow the public client 112 and/or private clients 132-1-m to traverse a corporate firewall and/or the NATs 128, 128a. The relay server 124 may be any electronic device as previously described with respect to the clients 112, 132 arranged to communicate any data such as media information between various media end points or destinations (e.g., public or private clients). In one embodiment, for example, the relay server 124 may be arranged to operate in accordance with the Internet Engineering Task Force (IETF) Session Utilities for NAT (STUN) protocol, as defined by the IETF RFC 3489 and its progeny, revisions and variants. When implementing the STUN protocol, the relay server 124 may sometimes be referred to as a STUN server. The STUN protocol provides a suite of tools for facilitating the traversal of the NAT device 128. Specifically, it defines the Binding Request, which is used by a client to determine its reflexive transport address towards the STUN server. The reflexive transport address can be used by the client for receiving packets from peers, but only when the client is behind a certain type of NAT. In particular, if a client is behind a type of NAT whose mapping behavior is address or address and port dependent, then the reflexive transport address will not be usable for communicating with a peer. In this case, the only way to obtain a transport address that can be used for corresponding with a peer through such a NAT is to make use of a relay, such as a relay server 124. The relay server 124 sits on the public side of the NAT device 128, and allocates transport addresses to clients reaching it from behind the private side of the NAT device 128 (e.g., network 130). These allocated addresses are from interfaces on the relay server 124. When the relay server 124 receives a packet on one of these allocated addresses, the relay server 124 forwards it toward the client.

In addition to the STUN protocol, the relay server 124 may be arranged to implement an extension of the STUN protocol referred to as the IETF Traversal Using Relays around NAT (TURN), as defined by the IETF Internet Draft titled "Traversal Using Relays around NAT (TURN): Relay Extensions to Session Traversal Utilities for NAT (STUN)", Jul. 8, 2007, and its progeny, revisions and variants. The TURN protocol allows a client to request an address on the STUN server itself, so that the STUN server acts as a relay. To accomplish that, this extension defines a handful of new STUN requests and indications. The ALLOCATE REQUEST is a component of this set of extensions. It is used to provide the client with a transport address that is relayed through the STUN server. A transport address which relays through an intermediary is called a relayed transport address. A STUN server that supports these extensions is sometimes referred to as a "STUN relay" or more simply a "relay," a "TURN server," a "TURN relay server," or similar designations. When the relay server 124 is configured for operation as a TURN server, the public client 112 and the private clients 132-1-m may be arranged to operate as clients, in accordance with the TURN protocol. The clients can communicate with a TURN server using any number of suitable communications transports, such as the (UDP), Transmission Control Protocol (TCP), or Transport Layer Security (TLS) over TCP. In some cases, a TURN server can even relay traffic between two different transports with certain restrictions.

To operate using the TURN protocol, the relay server 124 needs to authenticate the clients 112, 132 prior to allowing the clients 112, 132 to begin communicating media information through the relay server 124. The relay server 124 performs authentication operations for the clients 112, 132 using a shared secret between the relay server 124 and the respective clients 112, 132. The relay server 124 typically generates the shared secret, and distributes the shared secret to the clients 112, 132. Authentication operations may be performed using the registration server 136.

In general operation, the relay servers 124, 124a may implement the STUN and/or TURN protocols, which in some cases require the relay servers 124, 124a to open a bi-directional range of ports on both the relay servers 124, 124a and the public firewalls to allow private clients from different networks to communicate using the relay servers 124, 124a. The port range may include ports allocated for different network transports, such as a network transport using UDP and/or TCP, among others. This increases the potential connectivity scenarios between the public clients 112 and/or the private clients 132-1-m. Some entities are not comfortable, however, opening a relatively large incoming port range on the public firewall. For example, this may elevate security risks for the private network. Furthermore, deploying the relay servers 124, 124a directly to the public network 110 may consume scarce resources such as public transport addresses.

To solve these and other problems, the relay servers 124, 124a may implement respective enhanced relay manager modules 160, 160a. The enhanced relay manager modules 160, 160a may implement an enhanced relay server mapping protocol or protocol extension designed to enable communication between the relay servers 124, 124a and various clients they serve. In particular, the enhanced relay manager modules 160, 160a may implement an enhanced relay server mapping protocol or protocol extension designed for specific use with the relay servers 124, 124a implementing the TURN and/or STUN protocols to allow NAT traversal by various public and private clients. In one embodiment, for example, the enhanced relay manager modules 160, 160*a* may establish a media channel between various ports for the respective relay servers 124, 124*a* and through respective NAT 150, 150*a* deployed between the relay servers 124, 124*a* and the public network 110.

In the illustrated embodiment shown in FIG. 1, for example, the perimeter networks 120, 120*a* may have a network topology where NATs 150, 150*a* are deployed between the respective relay servers 124, 124*a* and the public network 110. Although the perimeter networks 120, 120*a* for a business entity may have multiple NAT devices for private clients, such as the NATs 128, 128*a*, the NATs 150, 150*a* may be dedicated devices for the respective relay servers 124, 124*a*, and specifically designed to provide NAT operations for the relay servers 124, 124*a*. In this manner, the relay servers 124, 124*a* may take advantage of the NAT features while still providing connectivity to the private clients 132-1-*m* and public clients 112 communicating through security mechanisms such as firewalls.

The relay servers 124, 124*a* may have multiple network interfaces to communicate with the various devices within the private networks 110, 110*a*, the perimeter networks 120, 120*a*, or the public network 130. In one embodiment, for example, the relay server 124 (or 124*a*) may have a first private network interface operative to communicate with a private client such as the peer client 132-1. The relay server 124 may also have a second private network interface operative to communicate with a NAT such as the NAT 150. Similarly, the NATs 150, 150*a* may have private network interfaces to communicate with the relay servers 124, 124*a*. In addition, the NATs 150, 150*a* may also include public network interfaces to communicate with the public network 110 and remote devices communicatively coupled to the public network 110.

The relay server 124 may also include the enhanced relay manager module 160 operative to receive a message from the private client over the first private network interface or a remote client over the second private network interface and through the NAT 150. An example for the private client includes the peer client 132-1, while an example for the remote client includes the public client 112 or the peer client 132-1*a*. The enhanced relay manager module 160 retrieves a public transport address and a mapped port for the NAT 150 from a mapped address attribute stored by the relay server 124. The enhanced relay manager module 160 then sends a response to the message with the public transport address and the mapped port to the private client or the remote client. In this manner, the relay servers 124, 124*a* may be deployed behind respective NATs 150, 150*a*, and still perform media relay operations in accordance with the STUN protocols and/or TURN protocols.

In various embodiments, this may be accomplished using a mapped port attribute that stores a port mapping between the relay servers 124, 124*a* and respective NATs 150, 150*a*. The mapped address attribute contains port information representing a port mapping between an allocated port for the relay servers 124, 124*a* and a mapped port for the NATs 150, 150*a*. In one embodiment, the port mapping may comprise a one-to-one port mapping. Depending on a specific implementation, however, the port mapping may comprise a one-to-many port mapping or a many-to-many port mapping. The latter arrangements may be desirable, for example, whenever multiple clients are communicating, such as a multimedia conference call. A port map may store various port mappings using port information stored by one or more mapped port attributes. The relay servers 124, 124*a* and/or the respective NATs 150, 150*a* may use the port maps (or mapped port attributes directly) to perform media relay operations when deployed behind the respective NATs 150, 150*a*.

In order for the relay servers 124, 124*a* to continue performing media relay operations when deployed behind the respective NATs 150, 150*a*, the enhanced relay manager modules 160, 160*a* utilize a port map providing a mapping between ports for the relay servers 124, 124*a* and ports for the NATs 150, 150*a*. In some cases, the port map provides a one-to-one mapping between ports for the relay servers 124, 124*a* and ports for the NATs 150, 150*a*. For example, the relay servers 124, 124*a* may have a number of designated control ports used for certain network transport protocols as designated by the TURN suite of protocols, such as UDP control port number 3478, TCP control port number 443, and so forth. When deployed behind the NATs 150, 150*a*, the relay servers 124, 124*a* and NATs 150, 150*a* store a mapped port attribute having a one-to-one port mapping between the control ports for the relay servers 124, 124*a* and specific corresponding ports for the NATs 150, 150*a*. In some cases, the mapped ports for the NATs 150, 150*a* may have the same or similar port numbers as the control ports for the relay servers 124, 124*a*, although different port numbers may be used as well.

In addition to control ports, the relay servers 124, 124*a* may each allocate specific ports to the private clients 132-1-*m* to establish a media channel between private clients and/or public clients for a media session. In one embodiment, for example, the enhanced relay manager module 160 is operative receive an ALLOCATION REQUEST message from a private client 132-1-*m* through the private network interface, allocate a port for the relay server 124 (or 124*a*) to the private client 132-1-*m* for use in communicating with the remote client, send a port mapping request message to the NAT 150 (or 150*a*) with an allocated port for the private client 132-1-*m*, and receive a port mapping response message from the NAT 150 (or 150*a*) with the mapped port for the NAT 150 (or 150*a*).

By way of example, assume a private client 132-1-*m* such as the peer client 132-1 desires to establish a media channel with the public client 112 or the peer client 132-1*a*. The peer client 132-1 may send an ALLOCATE REQUEST message to the relay server 124. The ALLOCATE REQUEST message is a TURN message that requests the relay server 124 to allocate or assign a port for the peer client 132-1. The relay server 124 receives the ALLOCATE REQUEST message, allocates a port number to the peer client 132-1, which is then sent to the peer client 132-1. The peer client 132-1 advertises the allocated port number and the public transport address for the relay server 124 to the public client 112 or the peer client 132-1*a*, which in turn uses this information to establish a media channel with the peer client 132-1. Since the relay server 124 is deployed behind the NAT 150, however, the relay server 124 not only allocates a port to the peer client 132-1, but also retrieves a mapped port for the NAT 150. The public transport address for the NAT 150 along with the mapped port for the NAT 150 is then sent to the peer client 132-1. The peer client 132-1 uses the public transport address and the mapped port for the NAT 150 to advertise to the public client 112 or the peer client 132-1*a*, and for subsequent media flow communications.

The relay servers 124, 124*a* may use the mapped port attribute for some or all of the signaling messages communicated when establishing a media channel for a media session, or when communicating media information over the established media channel. For example, any STUN and/or TURN messages received by the relay servers 124, 124a are processed using the mapped port information provided by the mapped port attribute associated with a given media session, and sent to the appropriate endpoint with the mapped port information. In one embodiment, for example, the enhanced relay manager modules 160, 160a may be operative to receive a SEND REQUEST message from a private client 132-1-m to send media information to a remote client, and communicate the media information between the relay servers 124, 124a and the remote client over the second private network interface and through the NATs 150, 150a using the public transport addresses and the mapped ports for the NATs 150, 150a retrieved from a stored mapped address attribute.

The NATs 150, 150a each have a private network interface operative to communicate with the respective relay servers 124, 124a, and a public network interface operative to communicate with remote clients. The NATs 150, 150a may further include respective NAT port manager modules 162, 162a. The NAT port manager modules 162, 162a may generally perform port management operations similar to the enhanced relay manager modules 160, 162a. The NAT port manager modules 162, 162a may receive public incoming messages over the public network interface from remote clients, perform port mapping or translation operations for the public incoming messages, and send private outgoing messages to the appropriate ports for the relay servers 124, 124a. Similarly, the NAT port manager modules 162, 162a may receive private incoming messages over the private network interface from private clients, perform port mapping or translation operations for the private incoming messages, and send public outgoing messages over the appropriate ports to the public network 110.

In one embodiment, for example, the NAT port manager modules 162, 162a are operative to receive a port mapping request message from the relay servers 124, 124a with an allocated port for a private client 132-1-m. The NAT port manager modules 162, 162 a allocate a port for the NATs 150, 150a to map with the allocated port for the private client 132-1-m to form mapped ports for the NATs 150, 150a, and send a port mapping response message to the relay servers 124, 124a with the mapped ports for the NATs 150, 150a.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints.

Figure 2:
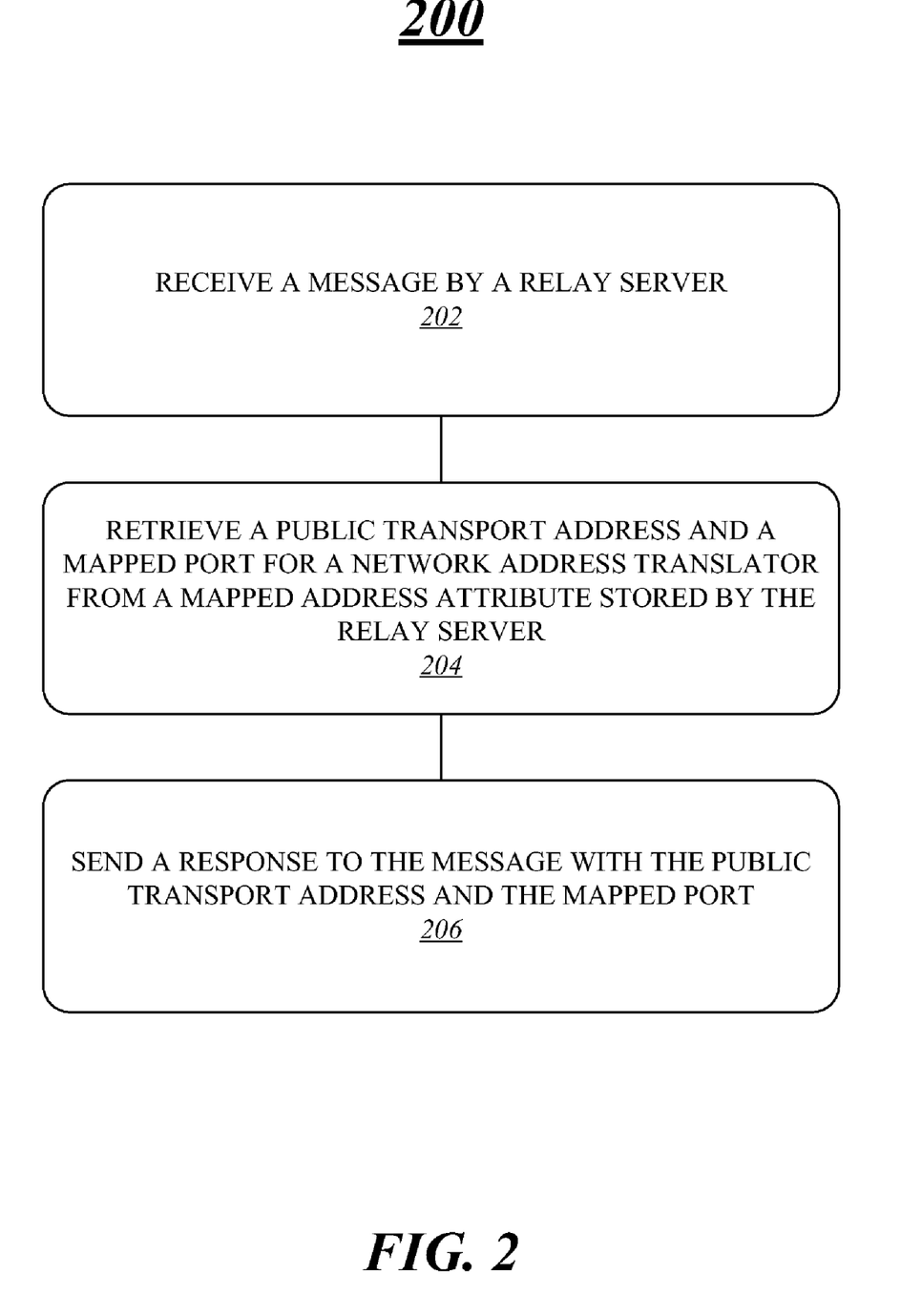
FIG. 2 illustrates one embodiment of a logic flow.

FIG. 2 illustrates a logic flow 200. The logic flow 200 may be representative of the operations executed by one or more embodiments described herein. The embodiments, however, are not limited to this representative logic flow 200.

In the illustrated embodiment shown in FIG. 2, the logic flow 200 may receive a message by a relay server at block 202. For example, the relay server 124 may receive a message from the peer client 132-1 on a private network interface for the private clients 132-1-m, or a remote client such as the public client 112 or the peer client 132-1a on a private network interface for the NAT 150.

The logic flow 200 may retrieve a public transport address and a mapped port for a NAT from a mapped address attribute stored by the relay server at block 204. For example, the relay server 124 may retrieve a public transport address and a mapped port for the NAT 150 from a mapped address attribute stored by the relay server 124. Additionally or alternatively, the relay server 124 may retrieve the public transport address and the mapped port for the NAT 150 directly from the NAT 150 in real-time communications.

The logic flow 200 may send a response to the message with the public transport address and the mapped port at block 206. For example, the relay server 124 may send a response to the message with the public transport address and the mapped port for the NAT 150. This may be done in lieu of the public transport address and the allocated port for the relay server 124 which is typically used by the relay server 124 for conventional STUN and TURN messages when directly interfacing with the public network 110. The peer clients may use the public transport address and the mapped port for the NAT 150 for STUN and TURN messages, and the relay server 124 and the NAT 150 may use the mapped port attributes to route and process the STUN and TURN messages in a manner that is transparent to the peer clients.

Figure 3:
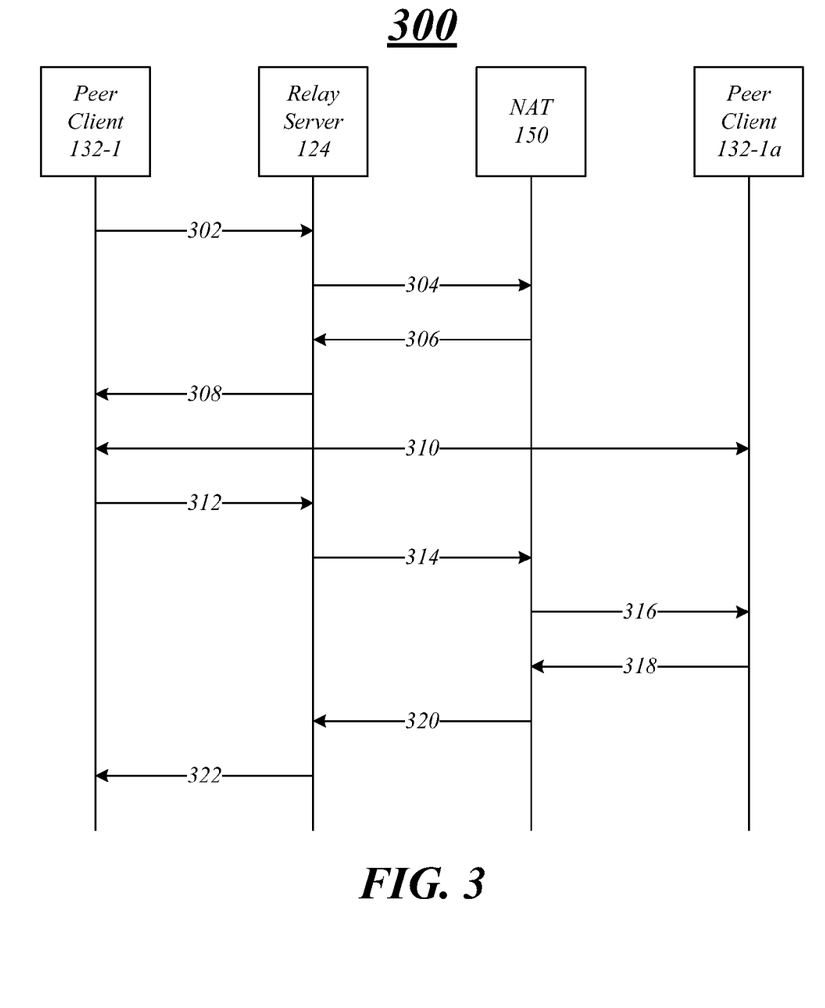
FIG. 3 illustrates one embodiment of a message flow.

FIG. 3 illustrates a message flow 300. The message flow 300 may be representative of a message flow between various elements of the communications system 100 as described with reference to FIG. 1. More particularly, the message flow 300 may provide a more detailed example of the message flow and operations of the communications system 100 in general.

For the message flow 300, the peer client 132-1 is assumed to be an authenticated user from a first business entity. The peer client 132-1 is behind the NAT 128 and is using the relay server 124 in the perimeter network 120 to allocate a publicly accessible transport address. The relay server 124, however, does not have direct access to the public network 110. Rather, the relay server 124 accesses the public network 110 via the NAT 150, which provides NAT and/or firewall operations for the relay server 124. The relay server 124 supports media relay operations for the STUN and/or TURN protocols via the NAT 150 by utilizing mapped port attributes for media sessions. The mapped port attribute provides a direct or indirect mapping between the ports used by the relay server 124 and the ports used by the NAT 150. The relay server communicates and processes STUN and TURN messages using the port mappings in a manner transparent to the clients. Consequently, the only modifications needed to implement the enhanced relay server mapping protocol are made to the relay server 124 and/or the NAT 150.

In the illustrated embodiment shown in FIG. 3A, assume the peer clients 132-1, 132-1a desire to establish a media flow between them using UDP or TCP as the network transport. They exchange the public transport addresses they allocated from their respective relay servers 124, 124a in the SDP of the SIP dialog sent from the peer clients 132-1, 132-1a using conventional SDP and SIP techniques. For example, the peer client 132-1 uses the TURN protocol to allocate a UDP or TCP public transport address from the relay server 124 as described below. The peer client 132-1a also performs similar port allocation operations as described below to allocate a UDP or TCP public transport address from the relay server 124a.

The peer client 132-1 sends an ALLOCATE REQUEST message to the relay server 124 as indicated by the arrow 302. The enhanced relay manager module 160 of the relay server 124 receives the ALLOCATE REQUEST message, and initiates port allocation operations to allocate a port number for the peer client 132-1 to use for a media session. Once a port number is allocated for the media session, the enhanced relay manager module 160 retrieves a public transport address and a mapped port for the NAT 150 from a mapped address attribute accessible by the relay server 124.

The enhanced relay manager module 160 may retrieve the public transport address and the mapped port for the NAT 150 in a number of different ways. In one embodiment, for example, the enhanced relay manager module 160 may retrieve a mapped port for the NAT 150 in real-time in response to an incoming message. In one embodiment, for example, the enhanced relay manager module 160 may retrieve a mapped port for the NAT 150 from a port map stored by the relay server 124.

In one embodiment, the enhanced relay manager module 160 may retrieve a mapped port for the NAT 150 in real-time in response to an incoming message. For example, the enhanced relay manager module 160 may send a novel PORT MAPPING REQUEST message from the relay server 124 to the NAT 150 with an allocated port for the peer client 132-1 as indicated by the arrow 304. The NAT port manager module 162 receives the PORT MAPPING REQUEST message from the relay server, and allocates a port for the NAT 150 to map with the allocated port for the peer client 132-1 to form the mapped port for the NAT 150. The NAT port manager module 162 sends a novel PORT MAPPING RESPONSE message to the relay server 124 with port mapping information for the NAT 150 as indicated by the arrow 306. The port mapping information may include a mapped port attribute having, among other information, the allocated port and the mapped port. The mapped port attribute may optionally include a public transport address for the NAT 150. Additionally or alternatively, the public transport address for the NAT 150 may be configured for the relay server 124 during initialization operations for the relay server 124, thereby reducing or eliminating the need to communicate the public transport address for the NAT 150 for every media session and associated messaging, thereby conserving communications bandwidth. The NAT port manager module 162 may send the mapped port attribute to the peer client 132-1 as indicated by the arrow 306.

The enhanced relay manager module 160 for the relay server 124 receives the PORT MAPPING RESPONSE message from the NAT 150 with the mapped port for the NAT 150. The enhanced relay manager module 160 stores the mapped address attribute with the mapping between the allocated port for the relay server 124 and the mapped port for the NAT 150. The enhanced relay manager module 160 then sends an ALLOCATE RESPONSE message to the ALLOCATE REQUEST message with the public transport address and the mapped port of the NAT 150 to the peer client 132-1 as indicated by the arrow 308. Subsequent messaging operations for the peer client 132-1 are performed using the public transport address and the mapped port of the NAT 150.

Additionally or alternatively, the enhanced relay manager module 160 may retrieve a mapped port for the NAT 150 from a port map stored by the relay server 124. Rather than communicating with the NAT 150 to retrieve a mapped port for a given media session, the relay server 124 and the NAT 150 may store a port map with predetermined port mappings between ports for the relay server 124 and the NAT 150. In this case, the relay server 124 may allocate a port for the relay server 124, retrieve the mapped port from the port map, and send the mapped port directly to the peer client 132-1. In this case, the operations associated with the arrows 304, 306 may be reduced or eliminated.

Once ports have been allocated, the peer clients 132-1, 132-1a exchange the public transport addresses and port numbers they allocated from their respective relay servers 124, 124a in the SDP of the SIP dialog sent from the peer clients 132-1, 132-1a using conventional SDP and SIP techniques. Rather than using the public transport addresses and port numbers for the relay servers 124, 124a, however, the peer clients 132-1, 132-1a exchange the public transport addresses and port numbers of the NATs 150, 150a allocated from their respective relay servers 124, 124a, as indicated by the arrow 310.

Once ports have been exchanged, the peer clients 132-1, 132-1a may exchange various STUN and/or TURN signaling messages to establish a media channel to communicate media information for a media session. For example, the peer client 132-1 sends data to the public transport address of the peer client 132-1a using a SEND REQUEST message as indicated by the arrow 312. The SEND REQUEST contains a DESTINATION ADDRESS attribute with the destination address comprising the public transport address of the peer client 132-1a as allocated by the relay server 124a. The public transport address and the port number for the peer client 132-1a may comprise a public transport address and a mapped port number for the NAT 150a, which in turn is mapped to the allocated port of the relay server 124a. The relay server 124 checks a connection cache associated with the allocated port for the peer client 132-1 and when it finds connection information, consults the mapped port attribute to identify the mapped port, and attempts to send the raw data from the allocated transport address of the peer client 132-1 to the mapped port for the NAT 150 using the public transport address and mapped port for the NAT 150 as the SOURCE ADDRESS attribute for the message flow, as indicated by the arrow 314.

The NAT port manager module 162 of the NAT 150 receives the raw data on its private network interface, realizes that it is from the relay server 124 as sent on behalf of the peer client 132-1, and consults the mapped port attribute for the media session to identify the mapped port number. The NAT port manager module 162 then sends the raw data to the allocated transport address for the peer client 132-1a on the relay server 124a using the mapped port for the NAT 150 as indicated by the arrow 316.

The peer client 132-1a, the relay server 124a and the NAT 150a may perform similar operations to establish the media channel with the peer client 132-1 via the relay server 124 and the NAT 150. Once the media channel is established, the peer client 132-1a may send media information to the peer client 132-1 via its own SEND REQUEST message as indicated by the arrow 318. The SEND REQUEST contains a DESTINATION ADDRESS attribute with the destination address comprising the public transport address of the peer client 132-1 as allocated by the relay server 124.

The NAT port manager module 162 of the NAT 150 receives the raw data on its public network interface, realizes that it is from the relay server 124a as sent on behalf of the peer client 132-1a, and consults the mapped port attribute for the media session to identify the mapped port number for the relay server 124 and the peer client 132-1. The NAT port manager module 162 then sends the raw data to the allocated transport address for the peer client 132-1 on the relay server 124 using the mapped port for the NAT 150 as indicated by the arrow 320.

The relay server 124 checks a connection cache associated with the allocated port for the peer client 132-1a and when it finds connection information, consults the mapped port attribute to identify the mapped port, and sends the raw data from the relay server 124 to the peer client 132-1 in a DATA INDICATION message as indicated by the arrow 322.

Figure 4:
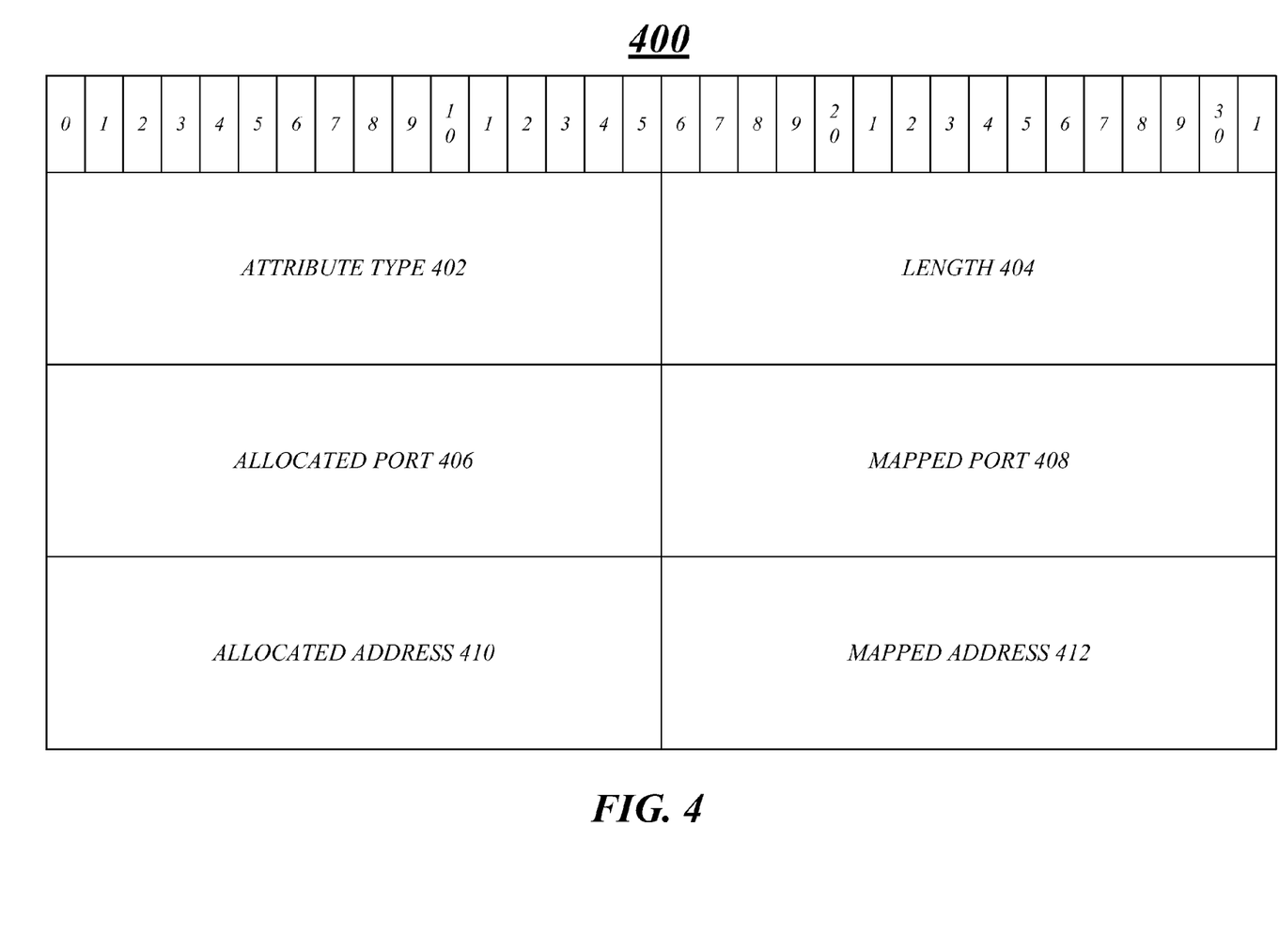
FIG. 4 illustrates one embodiment of a mapped address attribute.

FIG. 4 illustrates one embodiment of a mapped port attribute 400. Port mappings are established between the relay servers 124, 124a and the respective NATs 150, 150a through the use of messages containing mapped port attribute 400. Additionally or alternatively, the port mapping information stored by the mapped port attribute may be stored as part of the port map for the relay servers 124, 124a and the NATs 150, 150a.

In one embodiment, the mapped port attribute 400 comprises an 8 byte header. The mapped port attribute 400 provides an exemplary header suitable for use with the enhanced relay server mapping protocol. It may be appreciated that other data structures may be used for the mapped port attribute 400 as desired for a given implementation. The embodiments are not limited in this context.

In the illustrated embodiment shown in FIG. 4, the mapped port attribute 400 comprises an 8 byte header having an Attribute Type field 402, a Length field 404, an Allocated Port field 406, a Mapped Port field 408, an Allocated Address field 410, and a Mapped Address field 412. The Attribute Type field 402 may comprise 16 bits and identifies that the attribute is a mapped port attribute. The Length field 404 is 16 bits and counts the number of bytes of the frame following immediately after the Length field 404. The Allocated Port field 406 and the Allocated Address field 410 are both 16 bits and identify the respective allocated port and allocated address on the relay servers 124, 124a. The Mapped Port field 408 and the Mapped Address field 412 are both 16 bits and identify the respective mapped port and mapped address on the NATs 150, 150a.

The above-described embodiments operate effectively when a TURN client is attempting to communicate with a peer that has direct connectivity. In some cases, however, if a remote client is a TURN client relying on the same relay server 124 or 124a for a public transport address and port number for data reception, the relay server 124 or 124a needs to identify that the DESTINATION ADDRESS attribute of a SEND REQUEST message is actually the public transport address and mapped port for the respective NAT 150, 150a of another TURN client. In this case, the relay servers 124, 124a do not need to rely on the enhanced relay server mapping protocol. The relay server 124, 124a can instead identify this scenario and short circuit the SEND REQUEST directly to the TURN session of the remote client.

Figure 5:
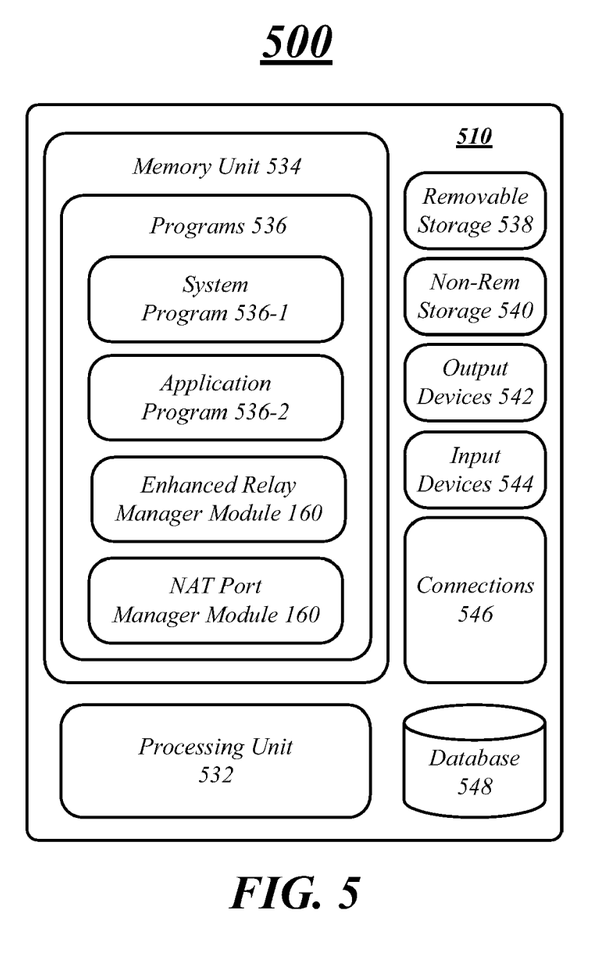
FIG. 5 illustrates one embodiment of a computing system architecture.

FIG. 5 further illustrates a more detailed block diagram of computing architecture 510 suitable for implementing various embodiments. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more software programs 536-1-t and accompanying data. Depending on the implementation, examples of software programs 536-1-t may include a system program 536-1 (e.g., an operating system), an application program 536-2 (e.g., a web browser), the enhanced relay manager module 160, the NAT port manager module 162, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-v. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
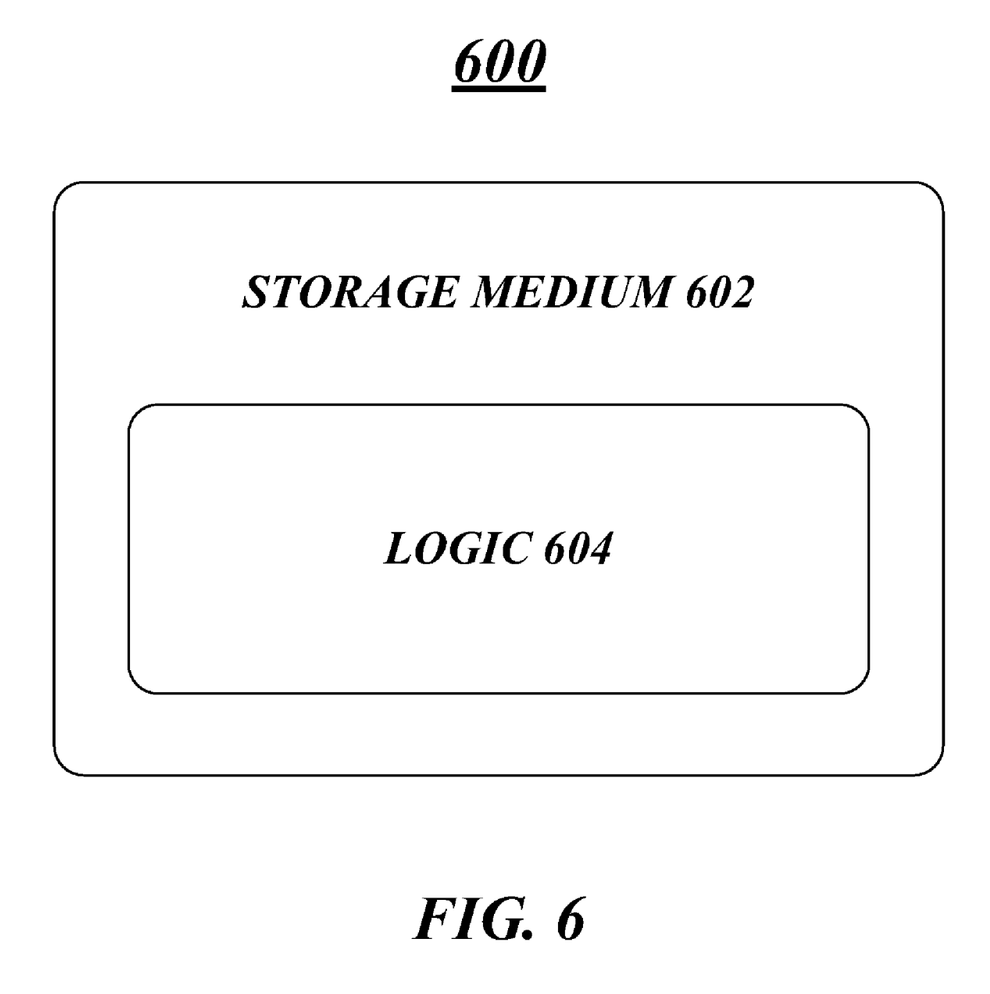
FIG. 6 illustrates one embodiment of an article of manufacture.

FIG. 6 illustrates a diagram an article of manufacture 600 suitable for storing logic for the various embodiments. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving a message from a private client by a relay server through a private network interface between the relay server and the private client, wherein the relay server implements an extension of a Session Traversal Utilities for Network Address Translation (STUN) protocol, the extension comprising a Traversal Using Relays around Network Address Translation (TURN) protocol;
   retrieving, by the relay server, a public transport address;
   receiving an allocation request message from the private client through the private network interface between the relay server and the private client;
   authenticating the private client;
   in response to receiving the allocation request message and authenticating the private client, allocating a port for the relay server to the private client for use in communicating with a remote client on a public network;
   retrieving, by the relay server, a mapped port for a network address translator from a mapped address attribute stored on the relay server, further comprising:
   sending a port mapping request message to the network address translator with the allocated port for the private client; and
   receiving a port mapping response message from the network address translator with the mapped port for the network address translator; and
   sending a response to the allocation request message with the public transport address and the mapped port.

2. The method of claim 1, comprising sending the response to the message with the public transport address and the mapped port from the relay server to a remote client through a network address translator.

3. The method of claim 1, comprising storing a mapped address attribute with a mapping between an allocated port for the relay server and the mapped port for the network address translator.

4. The method of claim 1, comprising receiving a send request message to send media information to a remote client from the private client.

5. The method of claim 1, comprising communicating media information between the relay server and a remote client through the network address translator using the public transport address and the mapped port for the network address translator from the mapped address attribute stored by the relay server.

6. A computer-readable storage device storing computer-executable instructions, which when executed perform a method to:
   receive a message by a relay server from a public client on a public network over a private network interface through a network address translator,
   wherein the network address translator is dedicated to providing network address translation operations for the relay server, the network address translator located between the relay server and the public network;

retrieve by the relay server a public transport address;
send a response to the message with the public transport address and the mapped port to the public client over the private network interface through the network address translator;
receive an allocation request message from a private client through another private network interface;
authenticate the private client;
in response to receiving the allocation request message and authenticating the private client, allocate a port for the relay server to the private client to communicate with the public client; and
retrieve by the relay server a mapped port for the network address translator from a mapped address attribute stored on the relay server,
further comprising sending a port mapping request message to the network address translator with the allocated port for the private client, and
receiving a port mapping response message from the network address translator with the mapped port for the network address translator.

7. The computer-readable storage device of claim 6, wherein the method further comprises steps to store a mapped address attribute with a mapping between the allocated port for the relay server and the mapped port for the network address translator.

8. The computer-readable storage device of claim 6, wherein the method further comprises steps to:
receive a send request message to send media information to the public client from the private client through another network interface; and
send media information to the public client through the network address translator using the public transport address and the mapped port for the network address translator.

9. A system, comprising:
a relay server having a private network interface operative to communicate with a public client on a public network through a network address translator, and
an enhanced relay manager module operative to receive a message from the public client over the private network interface and through the network address translator,
the enhanced relay manager module further operative to retrieve a public transport address,
receive an allocation request message from a private client through another private network interface,
authenticate the private client,
in response to receiving the allocation request message and authenticating the private client, allocate a port for the relay server to the private client for use in communicating with the public client,
retrieve a mapped port for the network address translator from a mapped address attribute stored on the relay server, further comprising
sending a port mapping request message to the network address translator with the allocated port for the private client, and
receiving a port mapping response message from the network address translator with the mapped port for the network address translator,
wherein the network address translator is dedicated to providing network address translation operations for the relay server, the network address translator located between the relay server and the public network, and send a response to the message with the public transport address and the mapped port to the public client through the network address translator.

10. The system of claim 9, the enhanced relay manager module operative to store a mapped address attribute with a mapping between the allocated port for the relay server and the mapped port for the network address translator.

11. The system of claim 9, the enhanced relay manager module operative to receive a send request message from the private client to send media information to the public client, and communicate the media information between the relay server and the public client over the private network interface and through the network address translator using the public transport address and the mapped port for the network address translator from a stored mapped address attribute.

12. The system of claim 9, the network address translator communicatively coupled to the relay server, the network address translator having another private network interface operative to communicate with the relay server, a public network interface operative to communicate with the public client, and a network address translator port manager module operative to receive a port mapping request message from the relay server with the allocated port for the private client, allocate a port for the network address translator to map with the allocated port for the private client to form the mapped port for the network address translator, and send a port mapping response message to the relay server with the mapped port for the network address translator.

* * * * *